United States Patent
Kishi

(10) Patent No.: US 6,691,137 B1
(45) Date of Patent: Feb. 10, 2004

(54) CACHE MANAGEMENT SYSTEM UTILIZING CASCADING TOKENS

(75) Inventor: Gregory Tad Kishi, Oro Valley, AZ (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/426,450

(22) Filed: Oct. 25, 1999

(51) Int. Cl.[7] .............................................. G06F 17/30
(52) U.S. Cl. ...................................................... 707/203
(58) Field of Search ................................ 707/200, 201, 707/203, 104.1, 102; 705/50; 715/515

(56) References Cited

U.S. PATENT DOCUMENTS

| | | | | |
|---|---|---|---|---|
| 5,568,639 A | * | 10/1996 | Wilcox et al. | 707/200 |
| 5,857,211 A | * | 1/1999 | Carper et al. | 715/515 |
| 6,151,607 A | * | 11/2000 | Lomet | 707/202 |
| 6,453,325 B1 | * | 9/2002 | Cabrera et al. | 707/204 |
| 6,470,353 B1 | * | 10/2002 | Yaung et al. | 707/103 R |
| 6,502,104 B2 | * | 12/2002 | Fung et al. | 707/103 R |
| 6,502,108 B1 | * | 12/2002 | Day et al. | 707/203 |

* cited by examiner

Primary Examiner—Safet Metjahic
Assistant Examiner—Sana Al-Hashemi

(74) Attorney, Agent, or Firm—Dan Hubert & Associates

(57) ABSTRACT

A data storage system, employing cache and base storage, assigns an "anywhere" token to each data object received for storage, whether the object is stored in cache or base storage. The anywhere token contains the latest metadata for the data object and includes at least a version code. If a data object is stored in base storage, the data object is assigned a "base" token with the same value as its anywhere token. These "cacading" tokens are available for use in tracking functions such as cache grooming, de-staging data to base storage, and processing cache miss events. All tokens are stored in a token database. For each data object, the token database lists its anywhere token and base token. If the storage system experiences a cache failure, normal storage operations are halted until the cache is repaired. Then, the controller implements a replacement token database. Namely, the controller accesses base storage to retrieve tokens of all data objects lost from cache. Using these base tokens, the controller populates a replacement token database, inserting the retrieved base tokens as both base and anywhere token for each data object lost from cache. Then, the replacement token database is used to the exclusion of the previous token database. With this procedure, the newly created token database accurately represents the contents of tape and cache. This avoids any danger of unknowingly recalling down-level data objects from tape, where their current counterpart data objects were stored on cache but lost in the cache failure.

31 Claims, 6 Drawing Sheets

CACHE MANAGEMENT SYSTEM UTILIZING CASCADING TOKENS

BACKGROUND OF THE INVENTION

1. Field of the Invention

The present invention relates to data storage systems that employ base storage along with a high speed cache. More particularly, the invention concerns a data storage system that assigns tokens to data objects stored in cache or base storage. For each data object, a token database tracks "cascading" tokens that include an "anywhere" token and "base" token. The data storage system uses these cascading tokens to track functions such as grooming the cache, de-staging data from cache to base storage, and processing cache miss events.

2. Description of the Related Art

Many data processing systems require a large amount of data storage, for use in efficiently accessing, modifying, and re-storing data. Data storage is typically separated into several different levels, each level exhibiting a different data access time or data storage cost. A first, or highest level of data storage involves electronic memory, usually dynamic or static random access memory (DRAM or SRAM). Electronic-memories take the form of semiconductor integrated circuits where millions of bytes of data can be stored on each circuit, with access to such bytes of data measured in nanoseconds. The electronic memory provides the fastest access to data since access is entirely electronic.

A second level of data storage usually involves direct access storage devices (DASD). DASD storage, for example, includes magnetic and/or optical disks. Data bits are stored as micrometer-sized magnetically or optically altered spots on a disk surface, representing the "ones" and "zeros" that comprise the binary value of the data bits. Magnetic DASD includes one or more disks that are coated with remnant magnetic material. The disks are rotatably mounted within a protected environment. Each disk is divided into many concentric tracks, or closely spaced circles. The data is stored serially, bit by bit, along each track. An access mechanism, known as a head disk assembly (HDA) typically includes one or more read/write heads, and is provided in each DASD for moving across the tracks to transfer the data to and from the surface of the disks as the disks are rotated past the read/write heads. DASDs can store gigabytes of data, and the access to such data is typically measured in milliseconds (orders of magnitudes slower than electronic memory). Access to data stored on DASD is slower than electronic memory due to the need to physically position the disk and HDA to the desired data storage location.

A third or lower level of data storage includes tapes, tape libraries, and optical disk libraries. Access to library data is much slower than electronic or DASD storage because a robot or human is necessary to select and load the needed data storage medium. An advantage of these storage systems is the reduced cost for very large data storage capabilities, on the order of Terabytes of data. Tape storage is often used for backup purposes. That is, data stored at the higher levels of data storage hierarchy is reproduced for safe keeping on magnetic tape. Access to data stored on tape and/or in a library is presently on the order of seconds.

Data storage, then, can be conducted using different types of storage, where each type exhibits a different data access time or data storage cost. Rather than using one storage type to the exclusion of others, many data storage systems include several different types of storage together, and enjoy the diverse benefits of the various storage types. For example, one popular arrangement employs an inexpensive medium such as tape to store the bulk of data, while using a fast-access storage such as DASD to cache the most frequently or recently used data.

During normal operations, synchronization between cache and tape is not all that important. If a data object is used frequently, it is stored in cache and that copy is used exclusively to satisfy host read requests, regardless of whether the data also resides in tape. Synchronization can be problematic, however, if the cache and tape copies of a data object diverge over time and the data storage system suffers a disaster. In this case, the cache and tape contain different versions of the data object, with one version being current and the other being outdated. But, which is which? In some cases, there may be some confusion as to which version of the data object is current. At worst, a stale or "down-level" version of a data object may be mistaken (and subsequently used) as the current version. Thus, in the event of cache failure, data integrity may be questionable and there is some risk of the data storage system incorrectly executing future host read requests by recalling a stale version of the data.

SUMMARY OF THE INVENTION

Broadly, the present invention concerns a data storage system that employs base storage along with a high speed cache. Whenever a data object is stored in the cache or base storage, it is assigned (and optionally encapsulated with) an anywhere token. The anywhere token contains a code indicating the data object's version. Whenever the data object is stored in base storage, the data object is assigned a base token with the same value as its current anywhere token. Thus, the base token also contains the data object's latest version code at the time the data object is written in base storage. However, the base token is frozen in time because future cache-only updates of the data object will have the effect of changing the anywhere token without affecting the base token. The anywhere/base tokens of each data object constitute cascading tokens. These cascading tokens are available for use by the data storage system to track functions such as grooming the cache, de-staging data to base storage, and processing cache miss events. All tokens are stored in a token database.

In more specfiic terms, the data storage system of this invention includes a controller, cache, base storage, and various organizational data such as a token database, cache directory, base-storage-written list, etc. For each data object, the token database is capable of listing an anywhere token and'a base token. When a data object is received for storage, the controller assigns an anywhere token to the data object. The anywhere token contains the latest metadata for the data object, including at least a version code. Optionally, the controller may encapsulate the data object with the version code and-some or all of the remaining metadata of the data object's anywhere token. The controller proceeds to store the data object in the cache, base storage, or both. The controller also stores the anywhere token in the token database, cross-referenced against the data object. Whenever the data object is written to base storage, the controller updates the token database by copying the anywhere token into the base token field for that data object. Contents of the token database are written out to base storage in pieces of suitable size, such as tokens of individual data objects, parts of the token database, or the entire token database as a whole.

If the storage system experiences a cache failure, normal storage operations are halted until the cache is repaired. Data objects lost from cache can be copied back into cache from base storage. Then, the controller implements a replacement token database. Namely, the controller accesses the token database excerpts in base storage to retrieve the base tokens of all data objects that were lost from cache but still exist in base storage. With these base tokens, the controller populates a replacement token database; namely, these base tokens are used as both anywhere and base tokens for the data objects lost from cache. Then, the replacement token database is used to the exclusion of the previous token database. This avoids any danger of unknowingly recalling down-level data objects from base storage, where newer counterpart data objects had been stored in cache but lost in the cache failure. Also, the cache may be repopulated with the lost data objects in one setting, or as needed in response to future cache misses.

The controller also oversees de-staging and grooming of the cache. According to a prescribed schedule, the controller repeatedly evaluates data objects stored in the cache to identify data objects suitable for storage in base storage. For each identified data object, the controller writes the identified data object to base storage, and copies the anywhere token to the base token in the token database. Under this or another schedule, the controller may also rid the cache of data objects written to base storage.

In one embodiment, the invention may be implemented to provide a method to utilize cascading tokens to manage a cache-equipped data storage system. In another embodiment, the invention may be implemented to provide an apparatus, such as a controller or entire data storage system, employing cascading tokens to manage cache-equipped data storage. In still another embodiment, the invention may be implemented to provide a signal-bearing medium tangibly embodying a program of machine-readable instructions executable by a digital data processing apparatus to perform operations for utilizing cascading tokens to manage a cache-equipped data storage system. Another embodiment concerns logic circuitry having multiple interconnected electrically conductive elements configured to perform operations as discussed above.

The invention affords its users with a number of distinct advantages. For example, the invention encourages data integrity because it keeps track of token levels in the cache and in base storage. Additionally, the invention aids in more reliable disaster recovery by using a backup copy of data stored in base storage. Recovery is also more reliable because the levels of tokens in base storage are known. The invention also provides a number of other advantages and benefits, which should be apparent from the following description of the invention.

DETAILED DESCRIPTION

Figure 1:
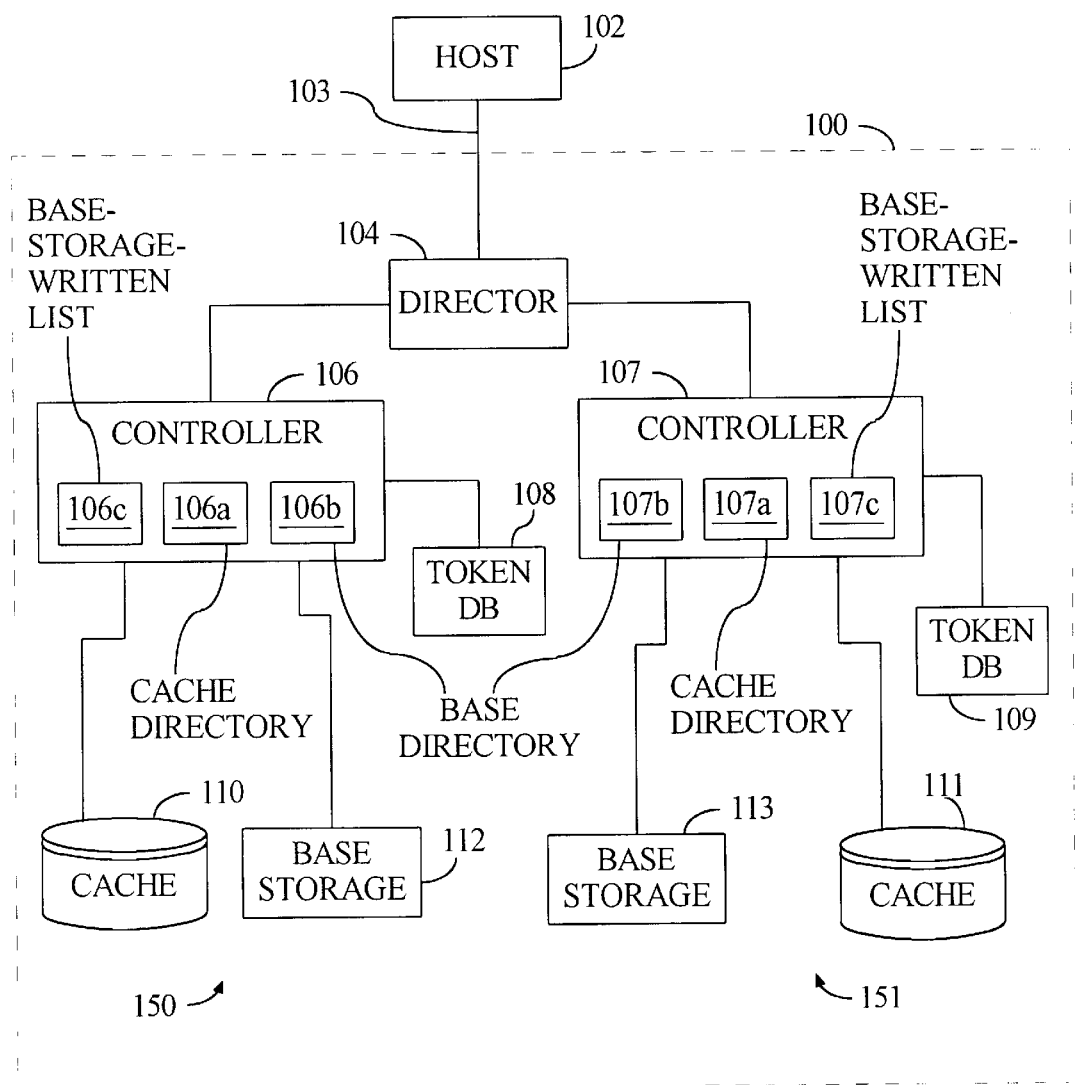
FIG. 1 is a block diagram of the hardware components and interconnections of a data storage system according to the invention.

The nature, objectives, and advantages of the invention will become more apparent to those skilled in the art after considering the following detailed description in connection with the accompanying drawings.

Hardware Components & Interconnections

One aspect of the invention concerns a data storage system, which may be embodied by various hardware components and interconnections. One example is described by the data storage system 100 of FIG. 1. As explained in greater detail below, the data storage system 100 stores data in base storage, and also utilizes a cache to more quickly access the more frequently or recently used data objects. Although the illustrated system utilizes two levels of data storage, three or more levels may be used without departing from the scope of this invention.

In the illustrated example, the system 100 provides redundant storage, where one copy of data is used for read/write access and the other copy is used as a backup. The data storage system 100 includes a director 104, which is coupled to two storage sites, including a primary site 150 and a backup site 151. Although two storage sites are shown in this example, a greater or lesser number may be used if desired.

Host

The data storage system 100 is coupled to a host 102. Among other possible functions, the host 102 supplies data to the system 100 for storage therein and sends requests to the system 100 to retrieve data therefrom. The host role may be satisfied by various types of hardware, such as a digital data processing computer, logic circuit, construction of discrete circuit components, interface to a human operator, etc. As an example, the host 102 may comprise an IBM RS/6000 machine employing an operating system such as MVS.

Director

In the data storage system 100, a storage director 104 relays host data storage/retrieval requests to hierarchically inferior components that carry out the requests. In the illustrated example, the director 104 also synchronizes data exchanges between the primary and backup redundant storage sites 150–151.

The director 104 communicates with the host 102 by an interface 103 such as wires/cables, one or more busses, fiber optic lines, wireless transmission, intelligent communications channel, etc. As an example, the interface 103 may comprise an ESCON director. The director 104 comprises a digital data processing machine, logic circuit, construction of discrete circuit components, or other automated mechanism for managing various storage operations in the system 100. The director 104 operates according to programming or other configuration, as discussed in greater detail below. To provide a specific example, the director 104 may comprise an RS/6000 component of a commercially available IBM Virtual Tape Storage ("VTS") Server product.

One of the dual storage sites 150–151 may be omitted to save costs and thereby provide non-redundant storage; in this case, the director 104 may also be omitted, and its function performed by the sole remaining controller 106 or 107.

Controller

The data storage system 100 also includes primary and backup controllers 106–107, which are coupled to the director 104. According to instructions from the director 104, the controllers 106–107 manage local storage operations conducted on respective cache 110–111 and base storage 112–113 units. The controllers 106–107 communicate with the director by interfaces such as wires/cables, one or more busses, fiber optic lines, wireless transmission, intelligent communications channel, etc.

Each controller 106–107 comprises a digital data processing machine, logic circuit, construction of discrete circuit components, or other automated mechanism for managing certain storage operations in the system 100, and operates according to suitable programming, physical configuration, etc. To provide a specific example, each controller 106–107 may comprise an RS/6000 component of a commercially available IBM VTS product.

The controllers 106–107 include respective cache directories 106a–107a. Each controller's cache directory lists the data objects residing in that controller's cache 110–111. The cache directories may list data objects by various means, such as name, volser, and/or certain metadata such as the data object's anywhere token, certain file attributes, etc. The controllers 106–107 may also include base directories 106b–107b listing contents of their respective base storage 112–113, or such directories may be stored on base ID storage instead. Each controller 106–107 also includes a base-storage-written list 106c–107c to track which data objects are being written from cache to base storage, as discussed in greater detail below.

Other Components of the Storage Sites

In addition to the controllers 106–107, each storage site includes a cache 110–111, base storage 112–113, and token database 108–109. The cache units 110–111 comprise high-speed storage devices to efficiently store and retrieve the most likely, most frequently, or most recently used data objects in the system 100. Although the cache units 110–111 may be implemented with nearly any type of digital data storage, cache preferably utilizes faster storage than would be practical or cost-effective for use as the base storage 112–113. Thus, the cache units 110–111 are best implemented by DASD, electronic memory, or other suitable fast-access storage appropriate to the applicable requirements of cost, access speed, reliability, etc.

In contrast to the cache, each base storage unit 112–113 preferably embodies one or more drives that access magnetic, optical, or other removable, serially accessible storage media. The base storage units 112–113 may comprise, for example, IBM model 3590 tape storage drives with a number of associated removable magnetic tape storage cartridges.

Also coupled to the controllers 106–107 are respective token databases 108–109, each storing a list of machine-readable "tokens," each cross-referenced against a corresponding data object. As explained below, each token contains various metadata relating to a data object stored in the cache 110–111 and/or base storage 112–113. The tokens may also be encapsulated with their respective data objects and stored in the cache 110–111 and/or base storage 112–113. The token databases 108–109 may be stored upon disk, base storage, electronic memory, or any desired media, whether physically distinct from the controllers 106–107 (as shown), or not.

Without any intended limitation, TABLE 1 (below) provides an exemplary list of information that may be included in each token.

TABLE 1 volume serial number ("volser")
version code
data inconsistent
data in state change
category ("scratch" or "private" base storage mount)
director ID
properties in state change
category inconsistent
volume damaged
export pending
import pending
MES flag
properties level As shown in TABLE 1, each token includes a "version code." Each version code comprises an alphabetic, alphanumeric, numeric, or other code indicating a data object's version. The version codes are useful to avoid recalling a stale version of a data object from base storage in the event of a cache failure, as explained in greater detail below. Version codes are also useful in processing cache miss events and grooming the cache.

TABLE 2, below, shows several exemplary entries in the token database 108. In this example, each row corresponds to one data object, and each data object is a logical volume. For each data object, TABLE 2 lists the data object's anywhere token and base token in corresponding anywhere token and base token fields. If any of these tokens do not exist, the table may contain a blank entry, zero entry, error code, etc. For example, the base token field is blank in the case of Volume 2, because that data object has not been written to base storage yet.

TABLE 2

Token Database

| DATA OBJECT | ANYWHERE TOKEN | BASE TOKEN |
| --- | --- | --- |
| Volume 1 | . . . version code 10 . . . | . . . version code 9 . . . |
| Volume 2 | . . . version code 90 . . . | blank |
| Volume 3 | . . . version code 51 . . . | . . . version code 51 . . . |

Redundant Storage

As described above, the present invention may optionally include redundant storage components, such as the backup controller 107, token database 109, cache 111, and base storage 113. In the illustrated example, the controller 106 and its associated storage components may be permanently designated "primary" with the other controller 107 and its storage components being "backup." Alternatively, under a more flexible arrangement, the sites 150–151 may operate in parallel with each other, on equal stature, with the sites temporarily assuming primary/backup roles for specific data storage and retrieval operations. In any event, the director 104 operates the backup storage site to replicate storage operations performed on the primary storage site. If one storage site experiences a failure, data storage/retrieval requests from the host 102 may still be carried out using the other storage site.

Exemplary Digital Data Processing Apparatus

As mentioned above, the director 104 and controllers 106–107 may be implemented using many different types of hardware. One example is a digital data processing apparatus, which may itself be implemented in various ways, such as the exemplary digital data processing apparatus 200 of FIG. 2. The apparatus 200 includes a processor 202, such as a microprocessor or other processing machine, coupled to a storage 204. In the present example, the storage 204 includes a fast-access storage 206, as well as nonvolatile storage 208. The fast-access storage 206 may comprise RAM, and may be used to store the programming instructions executed by the processor 202. The nonvolatile storage 208 may comprise, for example, one or more magnetic data storage disks such as a hard drive, a base storage drive, or any other suitable storage device. The apparatus 200 also includes an input/output 210, such as a line, bus, cable, electromagnetic link, or other means for the processor 202 to exchange data with other hardware external to the apparatus 200.

Despite the specific foregoing description, ordinarily skilled artisans (having the benefit of this disclosure) will recognize that the apparatus discussed above may be implemented in a machine of different construction, without departing from the scope of the invention. As a specific example, one of the components 206, 208 may be eliminated; furthermore, the storage 204 may be provided on-board the processor 202, or even provided externally to the apparatus 200.

Logic Circuitry

In contrast to the foregoing digital data storage apparatus, a different embodiment of the invention uses logic circuitry to implement one or more of the director 104 and controllers 106–107. Depending upon the particular requirements of the application in the areas of speed, expense, tooling costs, and the like, this logic may be implemented by constructing an application-specific integrated circuit (ASIC) having thousands of tiny integrated transistors. Such an ASIC may be implemented with CMOS, TTL, VLSI, or another suitable construction. Other alternatives include a digital signal processing chip (DSP), discrete circuitry (such as resistors, capacitors, diodes, inductors, and transistors), field programmable gate array (FPGA), programmable logic array (PLA), and the like.

Operation

In addition to the various hardware embodiments described above, a different aspect of the invention concerns a method for operating a data storage system that employ base storage media along with a high speed cache. This method is explained in greater detail below.

Signal-Bearing Media

Figure 2:
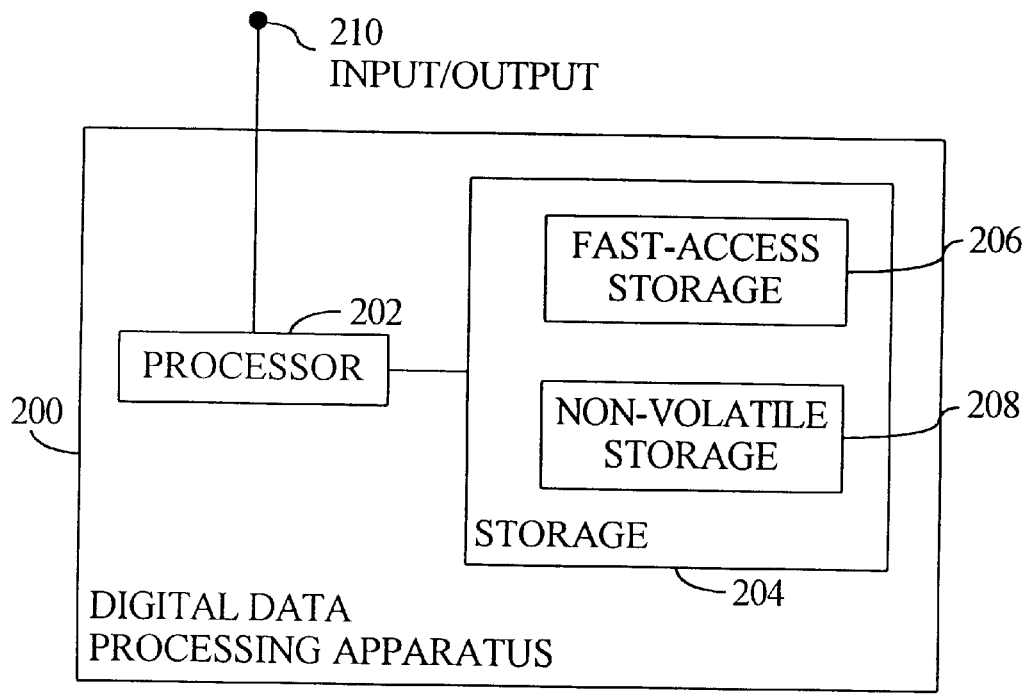
FIG. 2 is a block diagram of a digital data processing machine according to the invention.

In the context of FIGS. 1–2, such a method may be implemented, for example, by operating components such as the director 104 and/or controller(s) 106–107 (each embodying a digital data processing apparatus 200) to execute respective sequences of to machine-readable instructions. In the absence of a storage failure, the backup controller 107 operates according to a different sequence of instructions (not shown) than the primary controller 106, which primarily serve to copy data objects from the primary storage site 150 to the backup site 151 for backup purposes. The foregoing machine-readable instructions may reside in various types of signal-bearing media. In this respect, one aspect of the present invention concerns a programmed product, comprising signal-bearing media tangibly embodying a program of machine-readable instructions executable by a digital data processor to manage operations in a cache equipped data storage system.

Figure 3:
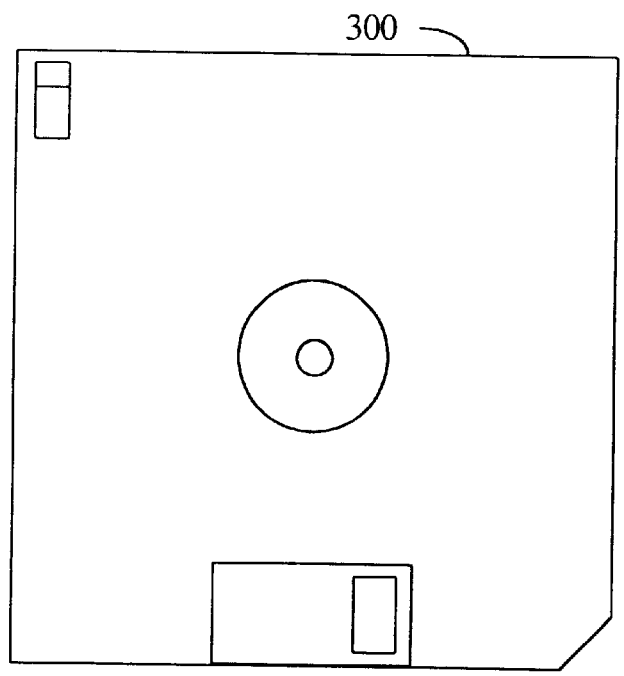
FIG. 3 shows an exemplary signal-bearing medium according to the invention.

This signal-bearing media may comprise, for example, RAM (not shown) contained within the director or controller, as represented by the fast-access storage 206 for example. Alternatively, the instructions may be contained in another signal-bearing media, such as a magnetic data storage diskette 300 (FIG. 3), directly or indirectly accessible by the processor 202. Whether contained in the storage 206, diskette 300, or elsewhere, the instructions may be stored on a variety of machine-readable data storage media, such as direct access storage (e.g., a conventional hard drive, redundant array of inexpensive disks (RAID), or another direct access storage device (DASD)), magnetic base storage, electronic read-only memory (e.g., ROM, EPROM, or EEPROM), optical storage (e.g., CD-ROM, WORM, DVD, digital optical base storage), paper "punch" cards, or other suitable signal-bearing media including transmission media such as digital and analog and communication links and wireless. In an illustrative embodiment of the invention, the machine-readable instructions may comprise software object code, compiled from a language such as "C," etc.

Logic Circuitry

In contrast to the signal-bearing medium discussed above, the method aspect of the invention may be implemented using logic circuitry, instead of executing instructions with a processor. In this embodiment, the logic circuitry is implemented in the components such as the director 104 and/or controller(s) 106–107, and is configured to perform operations to implement the method of the invention. The logic circuitry may be implemented using many different types of circuitry, as discussed above.

Write Sequence

Figure 4:
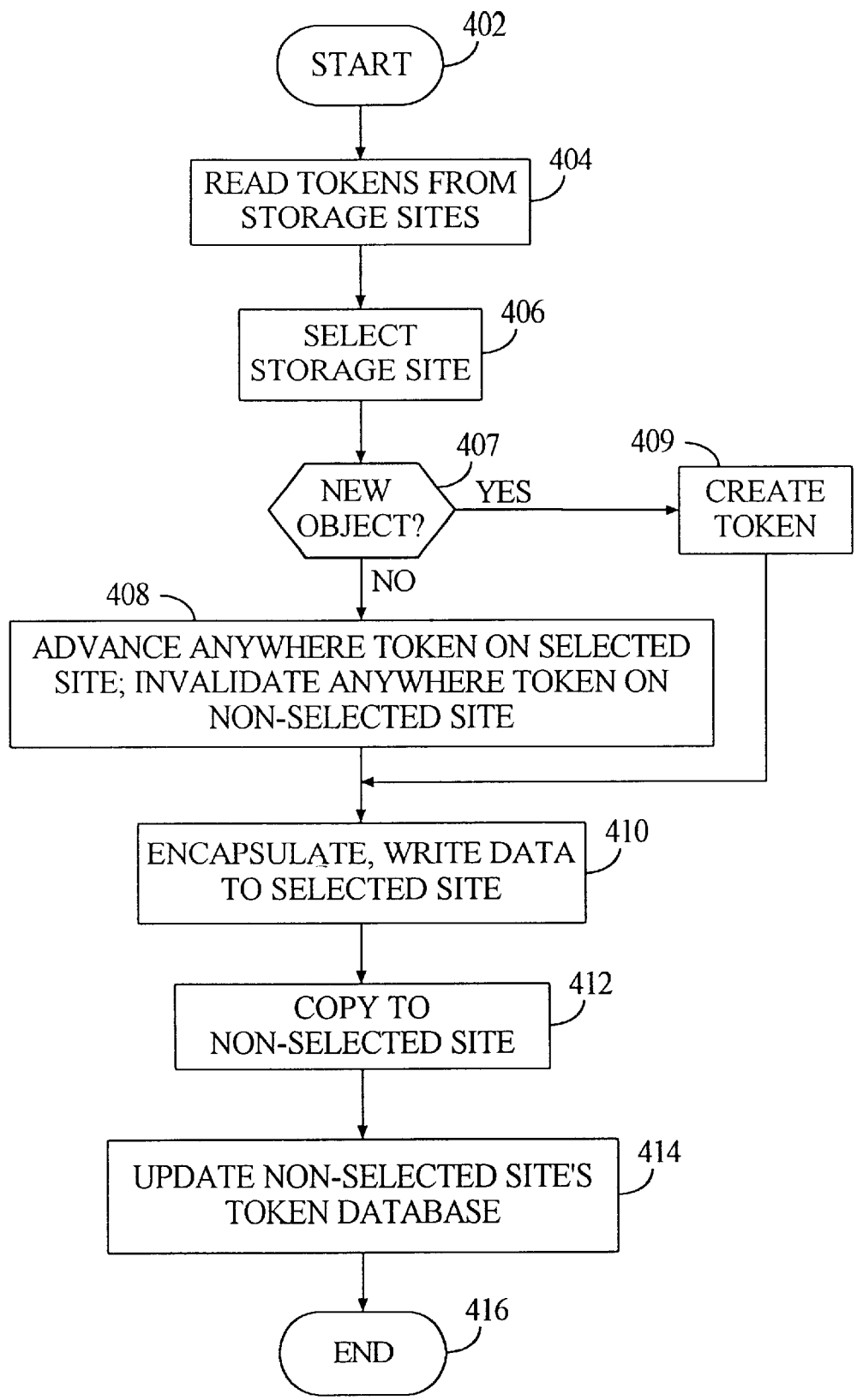
FIG. 4 is a flowchart of an operational sequence for storing data that utilize encapsulated tokens, according to one embodiment of the invention.

FIG. 4 shows a sequence 400 to describe the operation of writing data to storage. For ease of explanation, but without any intended limitation, the example of FIG. 4 is described in the context of the structure of FIGS. 1–2, described above. The sequence 400 begins in step 402, where the director 104 receives a data object and a write request from the host 102. The data object may comprise one or more files, records, logical volumes, bytes, pages, or other suitable unit of data.

After step 402, the director 104 instructs the controllers 106, 107 to locate the requested data object in the primary and backup storage sites 150–151 (step 404). This is done by reading the storage sites' token databases 108–109. Next, the director 104 selects one of the storage sites 150–151 for retrieval of the requested data object (step 406). As an example, the storage sites' may be operated to have non-overlapping caches to to present an effectively doubled cache size; in this event, step 406 selects the one storage site 150–151 containing the data object in cache. For the purpose of the upcoming write operation, the selected storage site becomes the primary site. Alternatively, machine loading, machine response time, or another criteria may be used to select a storage site in step 404. As still another alternative, one of the sites 150–151 may be permanently designated as the primary site, with this site being selected by default in step 406.

After step 406, step 407 asks whether the current data object is new to the storage site 150. If so, the controller 106 creates an anywhere token for the data object and stores the anywhere token in the token database 108 (step 409). Otherwise, if the data object already exists, the controller 106 advances the data object's anywhere token in its token database 108, in anticipation of storing the data object in cache (step 408). As an example, token advancement may be achieved by alphabetically, numerically, alphanumerically incrementing, regenerating, modifying, or otherwise supplying a version code for the data object. Also, if the non-selected site has cached the data object, the non-selected controller 107 invalidates the data object's anywhere token in its token database 109 (step 408); this prevents the director 104 from accessing the soon-to-be-stale data object in the non-selected storage site, for example if a failure occurs before the writing completes. The token in the database 109 may be invalidated, for example, by setting a bit, flag, or other prescribed region of the token to a predetermined value, or by another means such as deleting the token, etc.

After step 408 or 409, the controller 106 in step 410 optionally encapsulates the current data object with the data object's current token, which has been newly advanced (step 408) or newly created (step 409). Step 410 also writes the data object to the selected site's cache 110 and/or base storage 112, depending upon the type of data management strategy in place. Encapsulation may be performed, for example, by concatenating the data object and token, combining the data object and token with a compression algorithm, or another suitable technique. If step 410 involves the controller 106 writing the data object to cache, the controller in step 410 also proceeds to (1) write the data object's anywhere token into the token database 108, and (2) update the cache directory 106a by adding the newly written data object thereto. If step 410 involves writing the data object to base storage, step 410 is implemented by the controller: (1) updating the base storage list (if any), (2) updating the token database 108 by writing the anywhere token therein, and also (3) storing another copy of the anywhere token in the token database as the data object's the base token.

In step 412, the director 104 causes the controllers 106–107 to create a backup copy by copying the data object from the primary site 150 to the backup site 151. Next, in step 414, the backup controller 107 updates the backup site's token database 109 to reflect the newly copied data object. For example, the controller 107 may store the data object's anywhere token from the site 150 in place of the token that was previously invalidated in step 408. After step 414, the routine 400 ends in step 416.

Cache Management with (Optional) Integrated Purge

Figure 5:
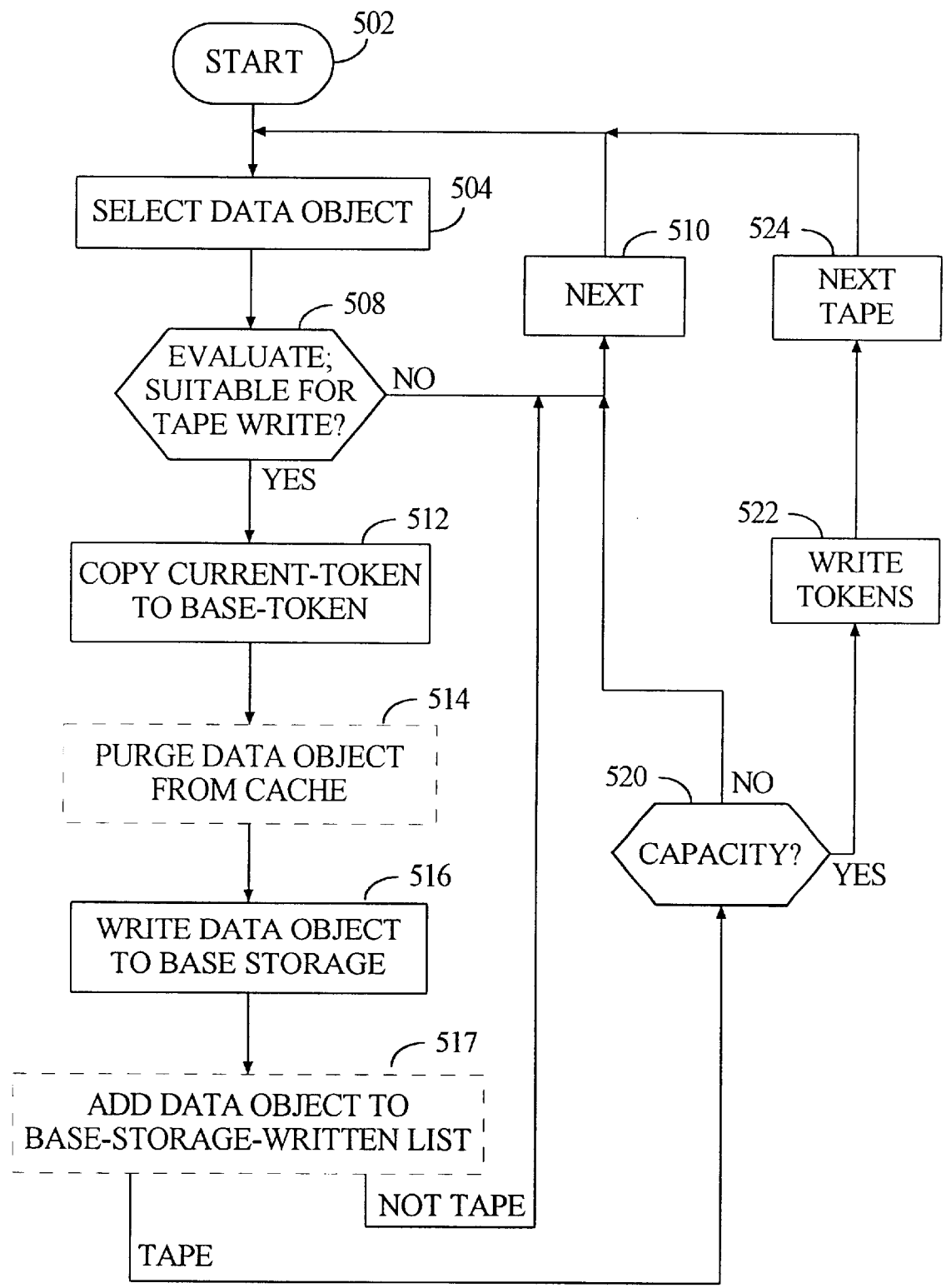
FIG. 5 is a flowchart showing a sequence for evaluating data objects stored in cache for possible storage in base storage, according to the invention.

FIG. 5 shows a sequence 500 to describe the operation of selectively copying data from cache to base storage. For ease of explanation, but without any intended limitation, the example of FIG. 5 is described in the context of the structure of FIGS. 1–2, described above. The sequence 500 is performed by the primary controller, which in this example is the controller 106. The backup controller 107 operates according to different instructions (not shown), which are concerned with carrying out a backup function by duplicating contents of the primary storage site 150. The sequence 500 is initiated according to a prescribed schedule, which may be periodic, non-periodic but nonetheless frequent, random, responsive to certain regular or irregular events in the storage system 100, etc. The sequence 500 starts in step 502.

After step 502, the controller 106 selects a data object listed in the cache directory 106a (step 504). As an example, the choice of step 504 may involve choosing the next data object in a serial progression through all data objects in the cache directory 106a. Next, in step 508, the controller 106 evaluates the selected data object to determine whether it is suitable for writing to base storage 112. The evaluation of step 508 may employ any suitable criteria, such as least frequently used, least recently used, random, etc. This operation, however, depends upon the whether the purpose of the routine 500 is to remove items from cache to base storage to conserve cache space (i.e., "de-staging"), copy data objects to base storage to update the base storage, etc. Accordingly, the details of this evaluation may depend upon whether the process 500 later purges the evaluated data object from cache, as described below in step 514, or whether this step is omitted.

Figure 6:
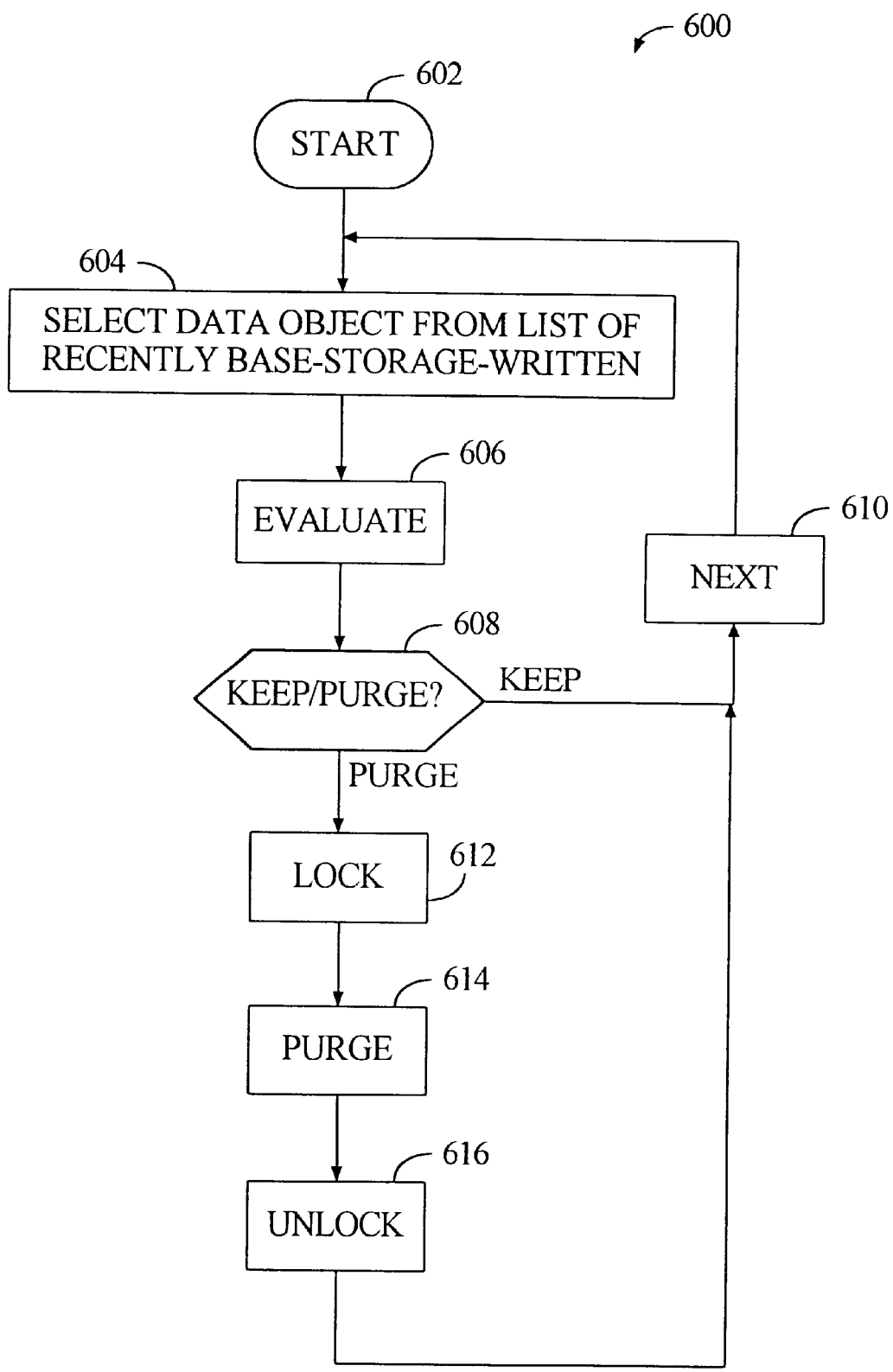
FIG. 6 is a flowchart showing a sequence for evaluating data objects stored in base storage for possible removal from cache, performed independently of the data objects' storage in base storage, according to the invention.

If the data object is not suitable for writing to base storage, the controller proceeds to the next data object in the cache directory 106a (step 510) and then returns to step 504. Otherwise, if the current data object is suitable for writing to base storage, step 508 proceeds to step 512. In preparing for this write operation, the controller 106 first updates the token database 108 by copying the data object's anywhere token into its base token field (step 512). Next, step 514 (optionally) purges the data object from cache 110. Step 514 is optional because, instead of purging the data object as part of the process of copying to base storage (as illustrated), the data object may be evaluated and purged independently (as shown in FIG. 6).

After step 514 (or step 512 if step 514 is omitted), the controller 106 writes the evaluated data object to the base storage 112 (step 516). After step 516, the controller 106 (optionally) adds the data object by name or other identity to a list of data objects recently written to base storage (step 517). This is the base-storage-written list 106c, and is stored in the controller 106 or storage accessible thereto, as shown in FIG. 1. This list is used by an independent purge process (described below) in selecting data objects to remove from cache. If the optional step 514 is implemented, the routine 500 may omit various features including the independent purge process as well as step 517 and the use of the base-written-storage list 106c.

After step 517, the controller 106 proceeds to step 510 unless tape media has been used to implement the base storage 112. In this case, the controller 106 proceeds to determine whether the currently mounted tape medium is nearing capacity (step 520). As an example, this may involve an assessment of the remaining storage space on tape in absolute terms (e.g., 1 Mb), the percentage of tape capacity that is full (e.g., 90% full), or another technique for determining when to conclude writing to the currently mounted tape medium. In the illustrated embodiment, step 520 deems the prescribed tape capacity to be met when a specific amount of empty storage space remains. If the tape is not nearing the prescribed capacity, the routine 500 proceeds to the next data object (step 510), selects this data object (step 504), and conducts evaluation as discussed above (step 508).

Otherwise, if the tape storage capacity is nearly met, step 520 leads to step 522. In step 522, the controller 106 consults the token database 108 to retrieve the tokens of all data objects stored on the currently mounted tape, and stores these tokens in the remaining empty space on the current tape medium. Alternatively, the controller 106 may store the entire token database 108 on the current tape without any such filtering. As still another alternative, step 522 may be omitted entirely if the data objects have been written in encapsulated form along with their respective tokens (step 410, FIG. 4). After step 522, step 524 mounts the next tape medium and then returns to step 504.

Independent Purge

As mentioned above, the previously described cache management sequence 500 (FIG. 5) may optionally purge items from cache (step 514) during the process of copying data objects to base storage. FIG. 6 shows an optional sequence 600 for purging data objects from cache, which is performed independently of the sequence 500. The sequence 600 may be performed as the sole means of purging the cache (if step 514 is omitted), or as an extra layer of cache management (if step 514 is retained). In either case, the sequence 600 utilizes the base-storage-written list 106c created according to step 517, FIG. 5.

For ease of explanation, but without any intended limitation, the example of FIG. 6 is described in the context of the structure of FIGS. 1–2, described above. The sequence 600 is performed by the primary controller, which in this example is the controller 106. As with FIG. 5, the backup controller 107 operates according to different instructions (not shown), which are concerned with carrying out a backup function by duplicating contents of the primary storage site. The sequence 600 is initiated according to a prescribed schedule, which may be periodic, non-periodic but nonetheless frequent, random, responsive to certain regular or irregular events in the storage system 100, etc. Referring to FIG. 6, the sequence 600 is initiated in step 602.

After step 602, the controller 106 selects a data object from the base-storage-written list 106c (step 604). As an example, the choice of step 604 may involve choosing data objects on a first-in-first-out basis. Other selection criteria may be used instead, however, such as choosing the largest data object to conserve space, etc. After step 604, step 606 evaluates the selected data object to determine whether it is suitable for removal from cache. The evaluation of step 606 may employ various criteria, such as least frequently used, least recently used, random, etc.

Based on the evaluation of step 606, the controller in step 608 asks whether it should keep or purge the data object. If the answer is "keep," step 610 proceeds to the next data object in the base-storage-written list, then returns to step 604. Step 610 may also delete the current data object from the list 106c at this time. If the answer from step 608 is "purge," the program 600 advances to step 612, where the controller 106 locks the data object in base storage to prevent any changes to the data object while the cached data object is being deleted. This prevents the undesirable creation of inconsistent to versions of the data object in base storage and cache.

Having locked the data object in base storage (step 612), the controller 106 then deletes the data object from cache 110 (step 614). Step 614 also deletes the data object's identity from the list 106c. After the data object is purged from cache, the controller then unlocks the data object in base storage (step 616), and then proceeds to consider the next data object (step 610).

Recovery Sequence

Figure 7:
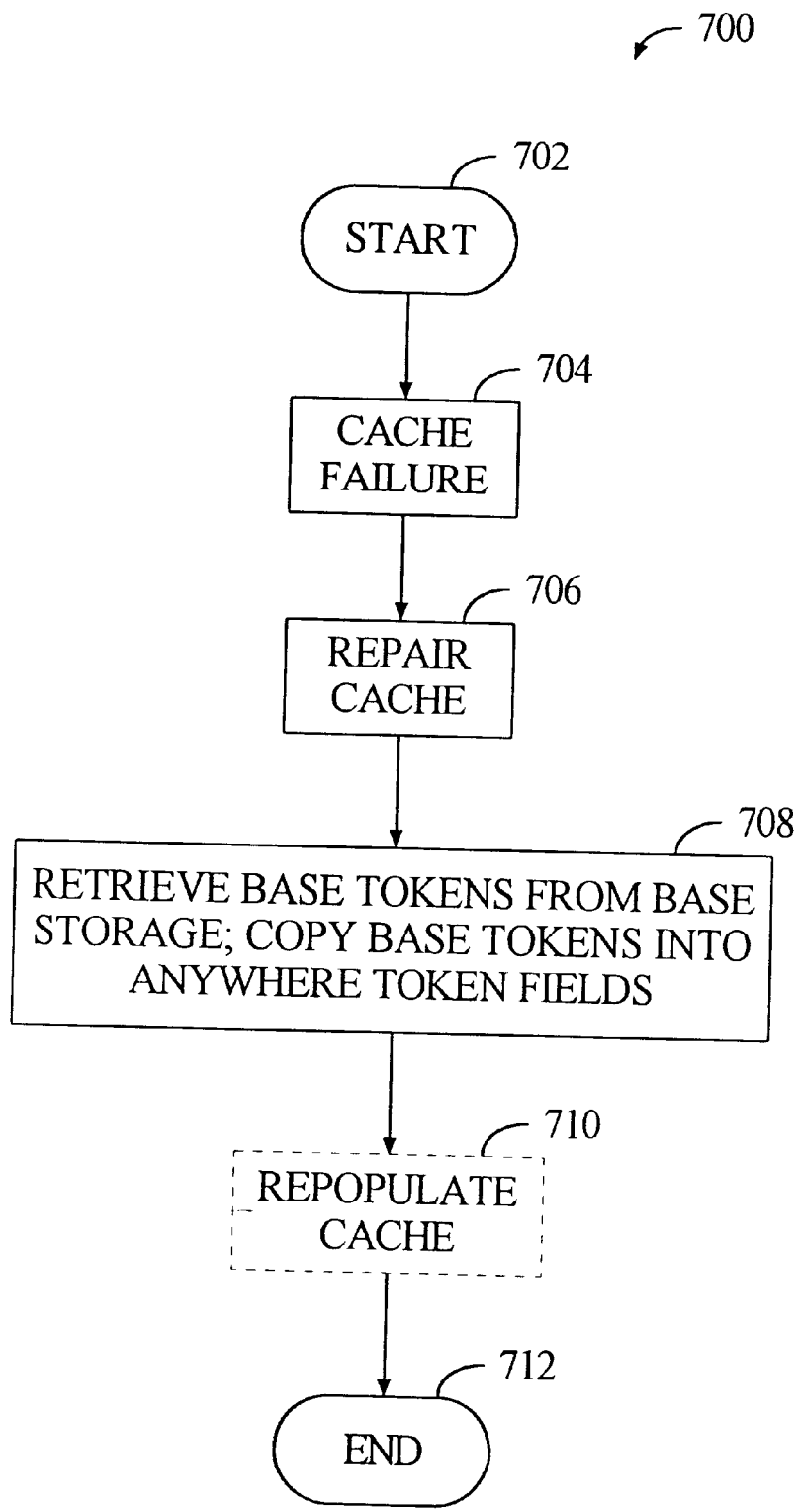
FIG. 7 is a flowchart showing an operational sequence for recovering data from base storage after a cache failure, according to the invention.

FIG. 7 shows a sequence 700 to describe the operation of recovering data from base storage in the event of a cache failure. For ease of explanation, but without any intended limitation, the example of FIG. 7 is described in the context of the structure of FIGS. 1–2, described above. After the sequence 700 begins in step 702, the cache 110 experiences a failure (step 704). To provide some illustrative examples, this failure may involve a catastrophic device failure, failure of a particular disk sector or other storage area, I/O failure, etc. Responsive to this failure, the controller 106 suspends cache storage operations.

In step 706, appropriate repairs are made to the cache 110 and associated cache directory 106a. In the event of a complete cache failure, the cache is effectively empty; therefore, the controller 106 formats the cache storage space and deletes the entire cache directory 106a.

In the event of a partial cache failure, the controller first determines which data objects have been lost. This is performed by: (1) accessing the cache to identify the data objects (e.g., by name, serial number, etc.) that are present in cache, and then (2) comparing this list to the cache directory 106a, since the cache directory presumably was not changed after the cache failure. The missing data objects stand out because they are missing from the cache yet appear in the cache directory. The cache directory is reconstructed by deleting the missing data objects.

After step 706, the controller 106 reconstructs the token database 108 in step 708. This step is necessary because the token database 108 may be incorrect if any data objects were lost from cache 110 as a result of the failure of step 704. In the case of a total cache failure, step 708 is performed by copying the base token field into the anywhere token field for each data object in the token database; this is appropriate because the data objects from base storage now provide the latest version of these data objects, since all cached copies (if any) were lost. If the token database 108 lists any data objects with an anywhere token but no base token, then these data objects were cached but never copied to base storage; in this case, these data objects have been lost from cache, and their anywhere tokens are deleted in step 708.

In the case of a partial cache failure, step 708 is performed by copying the contents of the base tokens (even if blank) into the corresponding anywhere tokens, but only for those data objects that were lost from cache. If the token database 108 lists any data objects with an anywhere token but no base token, then these data objects were cached but never copied to base storage; in this case, these data objects have been lost from cache, and their anywhere tokens are deleted in step 708. Step 708 therefore reconstructs the token database solely according to contents of base storage.

After step 708, step 710 optionally repopulates the cache 110. This involves copying the lost data objects (identified above) from base storage back into cache, if available. As an alternative, step 710 may be omitted, in which case repopulation of the cache is left to occur naturally when future cache misses occur. After step 710, the routine 700 ends in step 712.

OTHER EMBODIMENTS

While the foregoing disclosure shows a number of illustrative embodiments of the invention, it will be apparent to those skilled in the art that various changes and modifications can be made herein without departing from the scope of the invention as defined by the appended claims. Furthermore, although elements of the invention may be described or claimed in the singular, the plural is contemplated unless limitation to the singular is explicitly stated.

What is claimed is:

1. A method of managing a data storage system having a cache and a base storage, the method comprising operations of:

responsive to each receipt of a data object for storage in the data storage system, obtaining a unique anywhere token and storing the anywhere token in a token database in association with said data object;

responsive to receiving an update to a data object contained in the data storage system, obtaining an updated anywhere token and storing the updated anywhere token in the token database in association with that data object so as to replace any anywhere token previously stored in association with that data object;

performing storage management operations, comprising:

responsive to storage of a data object in the cache, storing the data object's most recent anywhere token in the token database in association with that data object;

responsive to storage of a data object in the base storage, storing the data object's most recent anywhere token in the token database in association with that data object, and also establishing a base token replicating the data object's most recent anywhere token and storing the base token in the token database in association with that data object;

in the base storage, recording contents of base tokens corresponding to a first group of data objects, the first group including at least those data object contained in the base storage;

responsive to a cache failure, ceasing the storage management operations; and responsive to resumption of cache operation, performing operations comprising:

identifying any data objects missing from the cache as a result of the cache failure;

for each data object missing from the cache, obtaining the data object's base token, creating a replacement anywhere token by replicating the base token, and establishing a replacement token database associating the data object with the base token and the replacement anywhere token;

utilizing the replacement token database in substitution for the previous token database.

2. The method of claim 1, the operations responsive to resumption of cache operation further comprising repopulating the cache by performing operations including:

searching the base storage for the identified data objects, and for each identified data object found in the base storage, copying the data object into the cache.

3. The method of claim 1, the operations further including an operation of grooming the cache, comprising:

according to a prescribed schedule, repeatedly evaluating data objects stored in the cache according to predetermined criteria to identify data objects suitable for storage in the base storage;

for each identified data object, performing operations comprising:

copying the identified data object from the cache to the base storage; and in the token database, setting the data object's base token equal to the data object's anywhere token without changing the data object's anywhere token.

4. The method of claim 3, the operation of grooming the cache further including:

deleting each of the identified data objects from the cache.

5. The method of claim 3, where the operations further include:

maintaining a list of data objects copied from the cache to the base storage;

independent of the operation of repeatedly evaluating data objects stored in the cache, assessing data objects on the list to identify data objects meeting a prescribed criteria for deletion from the cache; and only if a data object is identified as being suitable for deletion from cache, purging the data object from the cache.

6. The method of claim 1, the operations further including:

responsive to receiving a data object for storage in the system, and also responsive to receiving an update to a data object already stored in the system, encapsulating the data object with metadata including the anywhere token; and storing the encapsulated data object in at least one of the cache and the base storage.

7. The method of claim 6, where the operation of obtaining the base token is performed by copying the token from the encapsulated data object.

8. The method of claim 4, the operations further including:

responsive to copying the identified data object from the cache to the base storage, locking the data object in the base storage to prevent any access to the data object; and after purging the data object from the cache, unlocking the data object in the base storage.

9. The method of claim 1, where:

the base storage includes multiple storage media individually mountable to a read/write drive, each media having a predetermined storage capacity;

the operations further comprise, responsive to a currently mounted storage medium reaching the storage capacity, ceasing storage of data objects on the currently mounted storage medium; and the operation of recording contents of all base tokens corresponding to a first group of data objects comprises, responsive to the currently mounted storage medium reaching the storage capacity, storing contents of a first group of anywhere tokens upon the currently mounted storage medium, the first group of tokens including at least those tokens corresponding to data objects contained on the currently mounted storage medium.

10. The method of claim 9, the first group of tokens including all tokens in the token database.

11. A signal-bearing medium tangibly embodying a program of machine-readable instructions executable by a digital processing apparatus to perform operations to manage a data storage system, the operations comprising:

responsive to each receipt of a data object for storage in the data storage system, obtaining a unique anywhere token and storing the anywhere token in a token database in association with said data object;

responsive to receiving an update to a data object contained in the data storage system, obtaining an updated anywhere token and storing the updated anywhere token in the token database in association with that data object so as to replace any anywhere token previously stored in association with that data object;

performing storage management operations, comprising:

responsive to storage of a data object in the cache, storing the data object's most recent anywhere token in the token database in association with that data object;

responsive to storage of a data object in the base storage, storing the data object's most recent anywhere token in the token database in association with that data object, and also establishing a base token replicating the data object's most recent anywhere token and storing the base token in the token database in association with that data object;

in the base storage, recording contents of base tokens corresponding to a first group of data objects, the first group including at least those data object contained in the base storage;

responsive to a cache failure, ceasing the storage management operations; and responsive to resumption of cache operation, performing operations comprising:

identifying any data objects missing from the cache as a result of the cache failure;

for each data object missing from the cache, obtaining the data object's base token, creating a replacement anywhere token by replicating the base token, and establishing a replacement token database associating the data object with the base token and the replacement anywhere token;

utilizing the replacement token database in substitution for the previous token database.

12. The medium of claim 11, the operations responsive to resumption of cache operation further comprising repopulating the cache by performing operations including:

searching the base storage for the identified data objects, and for each identified data object found in the base storage, copying the data object into the cache.

13. The medium of claim 11, the operations further including an operation of grooming the cache, comprising:

according to a prescribed schedule, repeatedly evaluating data objects stored in the cache according to predetermined criteria to identify data objects suitable for storage in the base storage;

for each identified data object, performing operations comprising:

copying the identified data object from the cache to the base storage; and in the token database, setting the data object's base token equal to the data object's anywhere token without changing the data object's anywhere token.

14. The method of claim 13, the operation of grooming the cache further including:

deleting each of the identified data objects from the cache.

15. The medium of claim 13, where the operations further include:

maintaining a list of data objects copied from the cache to the base storage, independent of the operation of repeatedly evaluating data objects stored in the cache, assessing data objects on the list to identify data objects meeting a prescribed criteria for deletion from the cache; and only if a data object is identified as being suitable for deletion from cache, purging the data object from the cache.

16. The medium of claim 11, the operations further including:

responsive to receiving a data object for storage in the system, and also responsive to receiving an update to a data object already stored in the system, encapsulating the data object with metadata including the anywhere token; and storing the encapsulated data object in at least one of the cache and the base storage.

17. The medium of claim 16, where the operation of obtaining the base token is performed by copying the token from the encapsulated data object.

18. The medium of claim 14, the operations further including:

responsive to copying the identified data object from the cache to the base storage, locking the data object in the base storage to prevent any access to the data object; and after purging the data object from the cache, unlocking the data object in the base storage.

19. The medium of claim 11, where;

the base storage includes multiple storage media individually mountable to a read/write drive, each media having a predetermined storage capacity;

the operations further comprise, responsive to a currently mounted storage medium reaching the storage capacity, ceasing storage of data objects on the currently mounted storage medium; and the operation of recording contents of all base tokens corresponding to a first group of data objects comprises, responsive to the currently mounted storage medium reaching the storage capacity, storing contents of a first group of anywhere tokens upon the currently mounted storage medium, the first group of tokens including at least those tokens corresponding to data objects contained on the currently mounted storage medium.

20. The medium of claim 19, the first group of tokens including all tokens in the token database.

21. A logic circuit of multiple interconnected electrically conductive elements configured to perform operations to manage a data storage system having cache storage and base storage, the operations comprising:

responsive to each receipt of a data object for storage in the data storage system, obtaining a unique anywhere token and storing the anywhere token in a token database in association with said data object;

responsive to receiving an update to a data object contained in the data storage system, obtaining an updated anywhere token and storing the updated anywhere token in the token database in association with that data object so as to replace any anywhere token previously stored in association with that data object;

performing storage management operations, comprising:

responsive to storage of a data object in the cache, storing the data object's most recent anywhere token in the token database in association with that data object;

responsive to storage of a data object in the base storage, storing the data object's most recent anywhere token in the token database in association with that data object, and also establishing a base token replicating the data object's most recent anywhere token and storing the base token in the token database in association with that data object;

in the base storage, recording contents of base tokens corresponding to a first group of data objects, the first group including at least those data object contained in the base storage;

responsive to a cache failure, ceasing the storage management operations; and responsive to resumption of cache operation, performing operations comprising:

identifying any data objects missing from the cache as a result of the cache failure;

for each data object missing from the cache, obtaining the data object's base token, creating a replacement anywhere token by replicating the base token, and establishing a replacement token database associating the data object with the base token and the replacement anywhere token;

utilizing the replacement token database in substitution for the previous token database.

22. A data storage system, comprising:

a cache;

base storage; and a controller coupled to the cache and base storage, and programmed to perform operations to manage the data storage system, the operations comprising:

responsive to each receipt of a data object for storage in the data storage system, obtaining a unique anywhere token and storing the anywhere token in a token database in association with said data object;

responsive to receiving an update to a data object contained in the data storage system, obtaining an updated anywhere token and storing the updated anywhere token in the token database in association with that data object so as to replace any anywhere token previously stored in association with that data object;

performing storage management operations, comprising:

responsive to storage of a data object in the cache, storing the data object's most recent anywhere token in the token database in association with that data object;

responsive to storage of a data object in the base storage, storing the data object's most recent anywhere token in the token database in association with that data object, and also establishing a base token replicating the data object's most recent anywhere token and storing the base token in the token database in association with that data object;

in the base storage, recording contents of base tokens corresponding to a first group of data objects, the first group including at least those data object contained in the base storage;

responsive to a cache failure, ceasing the storage management operations; and responsive to resumption of cache operation, performing operations comprising:

identifying any data objects missing from the cache as a result of the cache failure;

for each data object missing from the cache, obtaining the data object's base token, creating a replacement anywhere token by replicating the base token, and establishing a replacement token database associating the data object with the base token and the replacement anywhere token;

utilizing the replacement token database in substitution for the discarded token database.

23. The system of claim 22, the operations responsive to resumption of cache operation further comprising repopulating the cache by performing operations including:

searching the base storage for the identified data objects, and for each identified data object found in the base storage, copying the data object into the cache.

24. The system of claim 22, the operations further including an operation of grooming the cache, comprising:

a according to a prescribed schedule, repeatedly evaluating data objects stored in the cache according to predetermined criteria to identify data objects suitable for storage in the base storage;

for each identified data object, performing operations comprising:

copying the identified data object from the cache to the base storage; and in the token database, setting the data object's base token equal to the data object's anywhere token without changing the data object's anywhere token.

25. The system of claim 24, the operation of grooming the cache further including:

deleting each of the identified data objects from the cache.

26. The system of claim 24, where the operations further include:

maintaining a list of data objects copied from the cache to the base storage;

independent of the operation of repeatedly evaluating data objects stored in the cache, assessing data objects on the list to identify data objects meeting a prescribed criteria for deletion from the cache; and only if a data object is identified as being suitable for deletion from cache, purging the data object from the cache.

27. The system of claim 22, the operations further including:

responsive to receiving a data object for storage in the system, and also responsive to receiving an update to a data object already stored in the system, encapsulating the data object with metadata including the anywhere token; and storing the encapsulated data object in at least one of the cache and the base storage.

28. The system of claim 27, where the operation of obtaining the base token is performed by copying the token from the encapsulated data object.

29. The system of claim 25, the operations further including:

responsive to copying the identified data object from the cache to the base storage, locking the data object in the base storage to prevent any access to the data object; and after purging the data object from the cache, unlocking the data object in the base storage.

30. The system of claim 22, where:

the base storage includes multiple storage media individually mountable to a read/write drive, each media having a predetermined storage capacity;

the operations further comprise, responsive to a currently mounted storage medium reaching the storage capacity, ceasing storage of data objects on the currently mounted storage medium; and the operation of recording contents of all base tokens corresponding to a first group of data objects comprises, responsive to the currently mounted storage medium reaching the storage capacity, storing contents of a first group of anywhere tokens upon the currently mounted storage medium, the first group of tokens including at least those tokens corresponding to data objects contained on the currently mounted storage medium.

31. The system of claim 30, the first group of tokens including all tokens in the token database.

* * * * *